July 3, 1923.
C. E. SWENSON
CLUTCH
Filed May 2, 1921
1,460,454
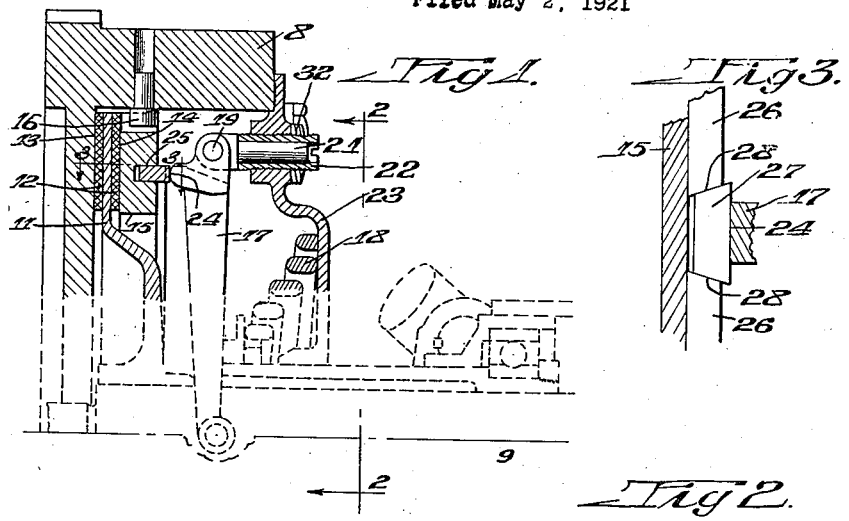
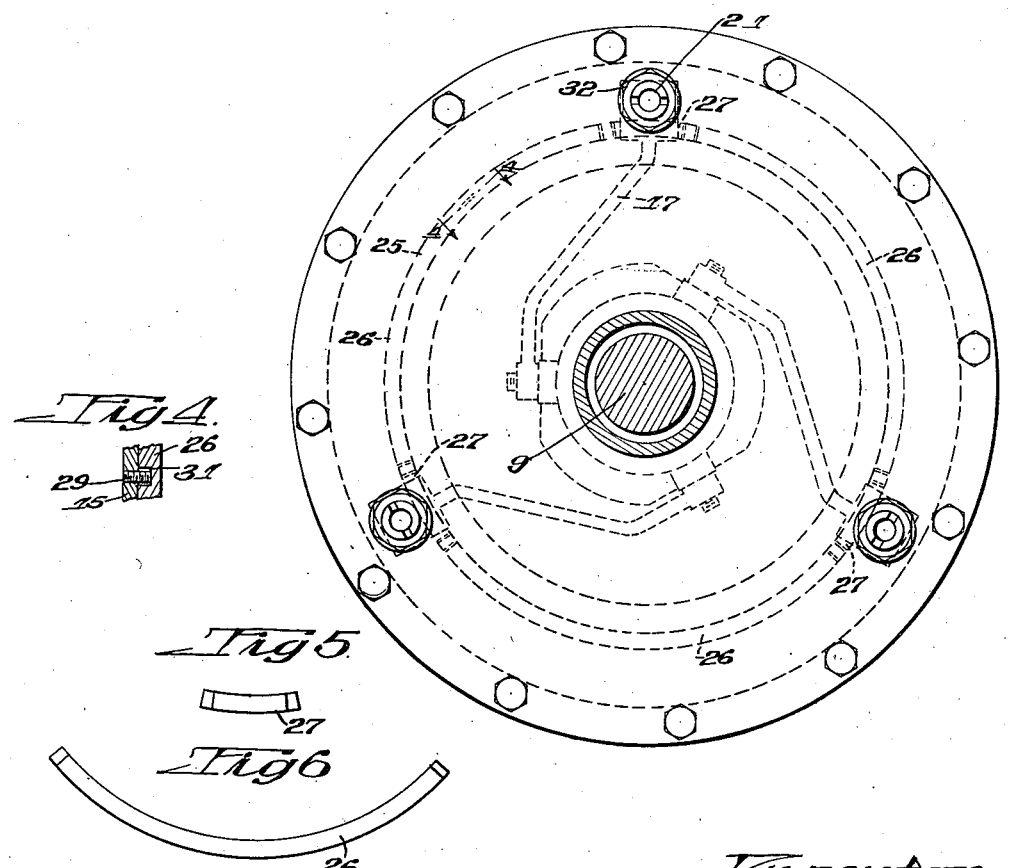

Patented July 3, 1923.

1,460,454

UNITED STATES PATENT OFFICE.

CARL E. SWENSON, OF ROCKFORD, ILLINOIS, ASSIGNOR OF ONE-FOURTH TO LEVIN FAUST, ONE-FOURTH TO ERIC S. EKSTROM, AND ONE-FOURTH TO CARL L. ANDERSON, ALL OF ROCKFORD, ILLINOIS.

CLUTCH.

Application filed May 2, 1921. Serial No. 466,031.

*To all whom it may concern:*

Be it known that I, CARL E. SWENSON, a citizen of the United States, residing at Rockford, in the county of Winnebago and State of Illinois, have invented certain new and useful Improvements in Clutches, of which the following is a specification.

This invention pertains to friction clutches especially adapted for use in motor vehicles, and the primary object is to provide an improved and novel means for causing the pressure which is applied for frictionally engaging the clutch members to be circumferentially equalized, thus preventing grabbing and promoting smooth and gradual engagement of the friction elements.

In furtherance of this general object, I have devised a unique means whereby the pressure applied at circumferentially spaced points will be equalized in its transmission to frictionally engageable elements. This means comprises in the present illustration of my invention a plurality of segmental members having inclined ends in abutting relation and so arranged in conjunction with the clutch operating means as to circumferentially equalize the pressure applied for frictionally engaging the clutch elements.

Another object is to provide a construction of the character described especially adapted for those clutches employing a plurality of radially disposed levers for transmitting the clutch-engaging pressure and permitting the use of any number of such levers, as distinguished from certain clutch designs in which the use of more than three levers is prohibitive.

Other objects and attendant advantages will be appreciated by those familiar with this art as the invention becomes better understood by reference to the following description when considered in connection with the accompanying drawings, in which—

Figure 1 is a fragmentary sectional view through a friction clutch embodying my invention;

Fig. 2, a sectional view looking at the driven end of the clutch and taken substantially on the line 2—2 of Fig. 1;

Fig. 3, a fragmentary sectional view taken substantially on the line 3—3 of Fig. 1;

Fig. 4, a detail sectional view taken on the line 4—4 of Fig. 2; and

Figs. 5 and 6 are views of the equalizer blocks removed from the clutch.

In illustrating this invention, I have taken as an example its application to that class of friction clutches in which the driving member is in the form of a fly-wheel 8 and the driven member, a shaft 9. It should be understood, however, that the invention is in no way limited to this particular class of clutches, but is generally applicable for the purpose of equalizing the clutch-engaging pressure as claimed herein. I have deemed it necessary, therefore, to show in the drawings only such parts of a clutch as are necessary for an understanding of the present invention.

In this example, the frictionally-engageable elements consist of a driven member in the form of a disk 11 fixed to the shaft 9 having friction ring surfaces 12 adapted to be engaged between the surface 13 of the fly-wheel and the surface 14 of the clutch plate or ring 15, the latter of which rotates with the driving member 8 by reason of the key connection 16 therewith, but is shiftable axially with respect to the fly-wheel for the purpose of engaging and disengaging the clutch. In this type of clutch two or more levers 17 actuated by spring means 18, under control of the operator, are employed for imparting the clutch-engaging pressure. The levers may be of any suitable or preferred construction, and in the present instance, each is connected at its outer end at 19, to a part 21, seated in a threaded part 22 threadingly connected to an end thrust plate 23 bolted to the fly-wheel. Each lever has an intermediate surface 24 adapted to bear against the clutch plate 15, so that upon moving the inner ends of the levers forwardly under the influence of the spring means 18, the clutch will be engaged. In the present instance, the lever surfaces 24 do not bear directly against the clutch plate 15 but against an intermediate equalizing device, which will be presently described. In the event, however, that said lever surfaces 24 work directly against the clutch plate, it will be manifest that due to slight differences and discrepancies in the dimensions of the several parts and to the difficulty of properly adjusting and setting the lever fulcrums, the levers will bear unequally against said plate, causing the pressure to be unequally applied.

It is the primary purpose of the present invention to cause the clutch-engaging pressure to be equalized between the several points of its application, in this instance through the medium of the levers, so that the friction surfaces will wear evenly, will not grab and will be caused to grip smoothly and gradually in a most efficient manner. To this end, my invention contemplates provision of novel means operative between the clutch plate 15 and the end thrust plate 23 for securing the desired result; and in the present example I prefer to interpose this means directly between the clutch plate 15 and the levers 17. As shown, the clutch ring 15 is provided with an annular groove 25, in which is located a plurality of alternating long and short segmental blocks 26 and 27 respectively, the latter of which correspond in number to and are in registration with the levers 17. These blocks have inclined ends 28 in abutting relation as shown in Fig. 3, and are of such length as to constitute a continuous ring, the segments of which are relatively movable for the purpose of circumferentially equalizing the lever pressure. As a result of this construction it will be manifest that irrespective of differences in dimensions of the lever arms, the thrust imparted by the levers will be equalized at the circumferentially spaced points of application, thus insuring the desired frictional contact of the clutch elements. For the purpose of preventing displacement of the blocks 27 from operative relation to the levers 17 but permitting limited movement of the blocks circumferentially in the groove 25, I employ a set screw 29, shown in Fig. 4, which passes through the plate 15 and engages in a recess 31 in the segmental block 26. From the foregoing it will be manifest that a clutch of this kind does not require the fine degree of adherence to dimensional tolerances as is necessary in other makes of clutches if accuracy in the frictional engagement is desired; that adjustment for wear may be made with equal and in fact greater facility, as by adjusting the individual levers by means of threaded members 22, which in this instance are equipped with suitable lock nuts 32; that the equalizing means may be variously applied as to location; that by use of such equalizing means the number of thrust levers need not be limited to two or three, but may be increased, as is frequently desired in tractor and other heavy duty clutches; that by reason of its unique and simple design it is thoroughly practical and effectually serves the purposes desired; and that by reason of the simplicity of the design from a manufacturing standpoint, such means may be embodied in a clutch at very low cost.

It is believed that the foregoing conveys a clear understanding of the objects prefaced above, and while I have illustrated but a single working embodiment thereof, it should be manifest that considerable change might be made in the construction and arrangement without departing from the spirit and scope of the invention as expressed in the appended claims.

I claim:

1. In a clutch of the character described, the combination with a driving member and a driven member in co-axial relation, an annular clutch plate adapted to be moved axially of the clutch for frictionally engaging the driving and driven members, a plurality of levers for actuating said clutch plate, spring means for operating the levers to engage the clutch, and a plurality of segmental blocks in annular relation having inclined abutting ends and being arranged to move axially and circumferentially of the clutch in co-operation with said levers for equalizing said clutch-engaging pressure.

2. In a clutch of the character described, the combination of frictionally engageable members including a clutch plate having an annular groove, and means for imparting clutch-engaging pressure to said plate including segmental blocks disposed in said groove and having inclined abutting ends so arranged as to circumferentially equalize said clutch-engaging pressure.

3. In a clutch of the character described, the combination with frictionally engageable members and a plurality of levers for engaging said members, of means operable between said levers and one of said members for engaging the clutch including a plurality of segmental blocks arranged in annular relation and having inclined abutting ends, said blocks being movable axially and circumferentially of the clutch for circumferentially equalizing the clutch-engaging pressure.

4. A clutch comprising frictionally engageable members, a plurality of levers for engaging said members, a ring interposed between said levers and one of said members and through which the lever pressure is imparted, and a plurality of segmental members carried by said ring and having inclined ends in abutting relation, said lever pressure being applied through said segmental members, whereby to equalize the clutch-engaging pressure.

5. A clutch comprising annular frictionally engageable members, a plurality of levers for engaging said members, a ring through which the lever thrust is imparted, said ring having an annular groove, and a plurality of segmental blocks in said groove having inclined abutting ends so arranged that the lever pressure will be equalized circumferentially of the ring when engaging the clutch.

CARL E. SWENSON.